United States Patent [19]

Otto

[11] Patent Number: 5,458,420
[45] Date of Patent: Oct. 17, 1995

[54] BEARING SEAL WITH ENCODER

[75] Inventor: Dennis L. Otto, Malvern, Ohio

[73] Assignee: The Timken Company, Canton, Ohio

[21] Appl. No.: 164,720

[22] Filed: Dec. 10, 1993

[51] Int. Cl.⁶ ............................ F16J 15/32; F16C 33/78
[52] U.S. Cl. .................. 384/448; 277/2; 277/35; 277/152
[58] Field of Search ............................ 277/2, 35, 37, 277/901, 152, 153; 384/448; 324/207.25

[56] References Cited

U.S. PATENT DOCUMENTS

| | | |
|---|---|---|
| 3,500,091 | 3/1970 | Jones . |
| 4,161,120 | 7/1979 | Cloarec . |
| 4,850,722 | 7/1989 | Bayer . |
| 4,884,901 | 12/1989 | Harsdorff . |
| 4,962,936 | 10/1990 | Matsushima . |
| 5,002,287 | 3/1991 | Eskilsson ................. 384/448 |
| 5,022,659 | 6/1991 | Otto . |
| 5,085,519 | 2/1992 | Dougherty . |
| 5,139,425 | 8/1992 | Daviet et al. ............ 277/901 |
| 5,195,830 | 3/1993 | Caillault et al. .......... 384/448 |

FOREIGN PATENT DOCUMENTS

| | | |
|---|---|---|
| 532011 | 3/1993 | European Pat. Off. . |
| 3809904 | 10/1989 | Germany . |
| 4135789 | 5/1992 | Germany . |
| 2207470 | 2/1989 | United Kingdom ........... 384/448 |
| 2188153 | 2/1990 | United Kingdom . |
| 2249397 | 5/1992 | United Kingdom . |

*Primary Examiner*—Daniel G. DePumpo
*Attorney, Agent, or Firm*—Polster, Lieder, Woodruff & Lucchesi

[57] ABSTRACT

A seal for a bearing having a rotating outer race and fixed inner race, closes the annular space between the two races and further excites a sensor which delivers a signal that reflects the angular velocity of the outer race. The seal has outer and inner cases and elastomeric sealing elements bonded to the cases. The outer race fits into a bore that opens out of the outer race and its seal element contacts the inner case along the inner race. The inner case fits over the inner race and its seal element is directed outwardly toward the outer case and outer race. In addition, the seal has an encoder ring which is secured to the outer case and presents a radial wall containing disruptions which excite the sensor when the disruptions move past the sensor as the encoder ring rotates with the outer race.

16 Claims, 4 Drawing Sheets

5,458,420

BEARING SEAL WITH ENCODER

BACKGROUND OF THE INVENTION

This invention relates in general to bearing seals and more particularly to seals which have the capacity to activate speed sensors.

Antilock brake systems, which are found on many automobiles and trucks of current manufacture, require devices at the road wheels for sensing the angular velocities of those wheels. On any vehicle so equipped, the speed sensing devices generate signals which are monitored by a processor that in turn controls the braking forces applied to the wheels, the object being to keep all four wheels rotating at the same velocity, even though one of the wheels may be rolling over a surface that offers considerably less frictional resistance than the surface over which the other wheels are rolling.

The typical speed sensing device includes an encoder ring which rotates with the road wheel that is to be monitored and a sensor which is excited by the encoder ring in the sense that it produces a pulsating electrical signal which reflects the angular velocity of the ring. To this end, the ring, which is formed from a ferrous metal, has discontinuities in the form of teeth or apertures that disrupt a magnetic flux upon rotation of the ring. The sensor responds to the periodic disruptions and delivers a signal, the frequency of which is proportional to the angular velocity of the ring and road wheel.

Typically, the nondriven wheels of an automotive vehicles are attached to hubs which rotate about spindles that are fixed in the sense that they do not rotate, there being wheel bearings between the spindles and hubs. If the vehicle is equipped with an antilock braking system, the encoder rings for these wheels are normally fitted over the hubs. But space is limited in the region of the bearings and hubs, and the encoder rings and the sensors represent unnecessary protuberances in these confined spaces.

The present invention resides in a seal which provides a highly effective barrier for excluding contaminants from and for keeping lubricants within the interior of an antifriction bearing, yet further serves as an encoder ring for activating a speed sensor. As such, the encoder ring and speed sensor easily fit the highly confined region surrounding the hub.

DESCRIPTION OF THE DRAWINGS

In the accompanying drawings which form part of the specification and wherein like numerals and letters refer to like parts wherever they occur.

DETAILED DESCRIPTION

Figure 1:
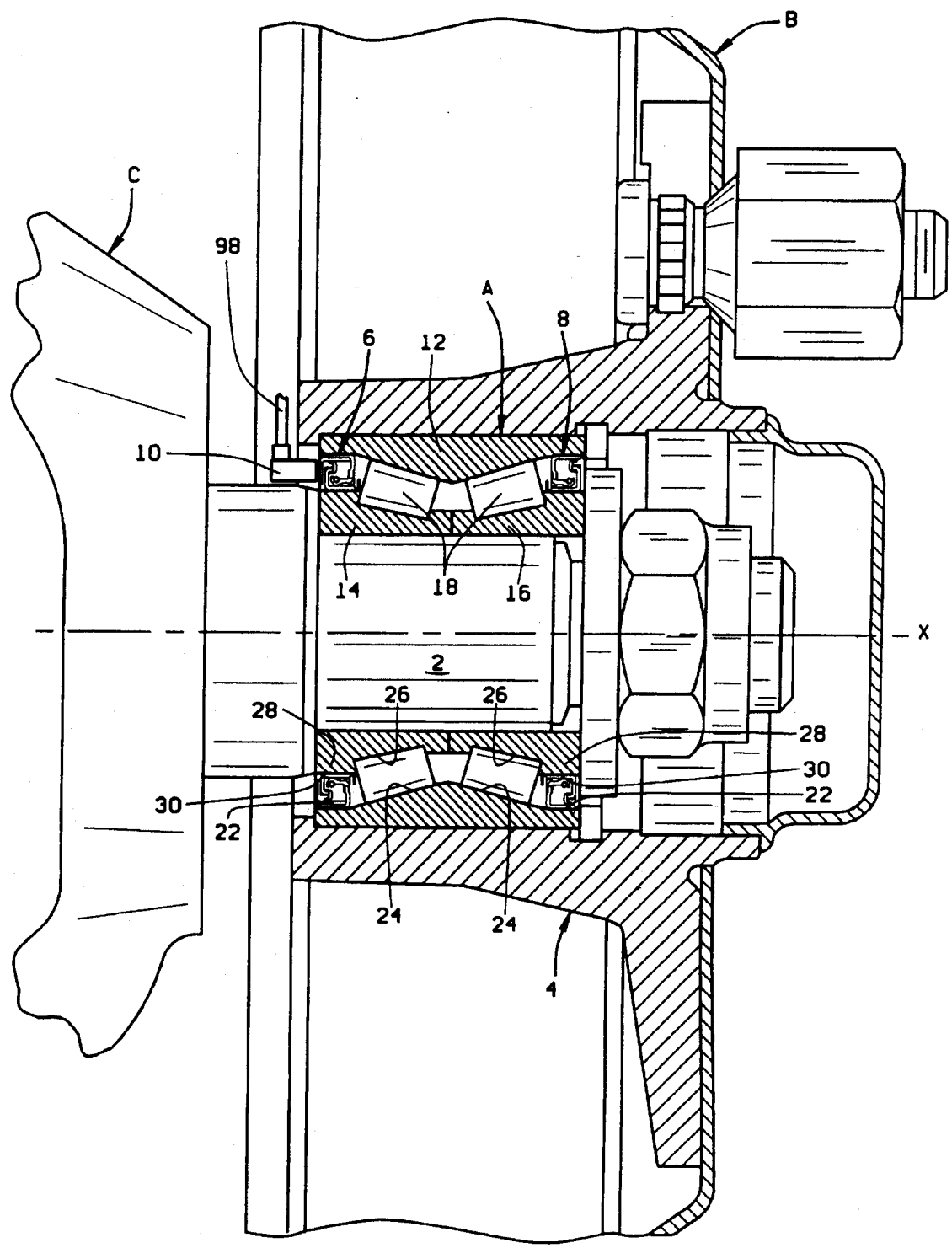
FIG. 1 is a sectional view in elevation of a bearing assembly fitted with a seal constructed in accordance with and embodying the present invention, the bearing assembly being installed over a spindle.

Referring now to the drawings (FIG. 1), an antifriction bearing A couples a road wheel B to the suspension system C of an automotive vehicle. Actually, the bearing A fits between a spindle 2, that is attached to and projects from the suspension system C of the vehicle, and a hub 4 to which the road wheel B is attached, all to enable the road wheel B to rotate about an axis X of rotation which is of course the axis of the spindle 2. The bearing A is fitted with seals 6 and 8 at its inboard and outboard ends, respectively, to isolate its interior from the surrounding environment and to retain a lubricant within the bearing. The inboard seal 6 further excites a speed sensor 10 such that the sensor 10 produces a signal that reflects the angular velocity of the wheel B indeed, a signal suitable for the effective operation of an antilock braking system or traction control system.

The bearing A includes (FIG. 1) an outer race in the form of a double cup 12, an inner race in the form of two cones 14 and 16, and rolling elements in the form of tapered rollers 18 arranged in two circular rows between the cup 12 and the two cones 14 and 16. The cup 12 fits into the hub 4 within which it is captured, whereas the two cones 14 and 16 fit over the spindle 2, they likewise being captured—indeed clamped—so they cannot be withdrawn from or even shift axially on the spindle 2.

At its ends, the cup 12 has machined bores 22 (FIG. 1) which are cylindrical and actually open out of the ends of the cup 12. The bores 22 in turn lead to two raceways 24 which taper downwardly to the midportion of the cup 12. The two cones 14 and 16 lie within the cup 2, each having an outwardly presented raceway 26 that is tapered and a thrust rib 28 which projects radially outwardly beyond the large end of the raceway 26. The thrust rib 28 has a cylindrical surface 30 which runs out to the end of its cone 14 or 16, that is, to the so-called cone back face against which the clamping force of the spindle 2 is applied. The two cones 14 and 16 abut at their opposite ends, that is, at their front faces, and when so arranged, their raceways 16 lie within and face the raceways 24 of the cup 12, while the cylindrical surfaces 30 of their thrust ribs 28 lie within the end bores 22 of the cup 12. The cone raceways 26 likewise taper downwardly toward the midportion of the bearing A where the two cones 14 and 16 abut.

The rollers 18 lie in circular rows between the opposed raceways 24 and 26 of the cup 12 and the cones 14 and 16, with their tapered side faces contacting the raceways 24 and 26. The large end faces of the rollers 18 bear against the thrust ribs 28 for the cones 14 and 16, and indeed, the ribs 28 prevent the rollers 18 from being expelled from the annular space between the cup raceways 24 and the cone raceways 26, that is from the interior of the bearing A.

The inboard seal 6 fits into the inboard end bore 22 of the cup 12 and around the thrust ribs 28 of the inboard cone 24 to close one end of the annular space between the cup and cone raceways 24 and 26. The outboard seal 8 fits into the outboard bore 22 of the cup 2 and around the thrust rib 18 of the outboard cone 26, closing the other end of the annular space that exists between the raceways 24 and 26. Thus, the seals 6 and 8 isolate the annular interior of the bearing A from the surrounding environment.

Figure 2:
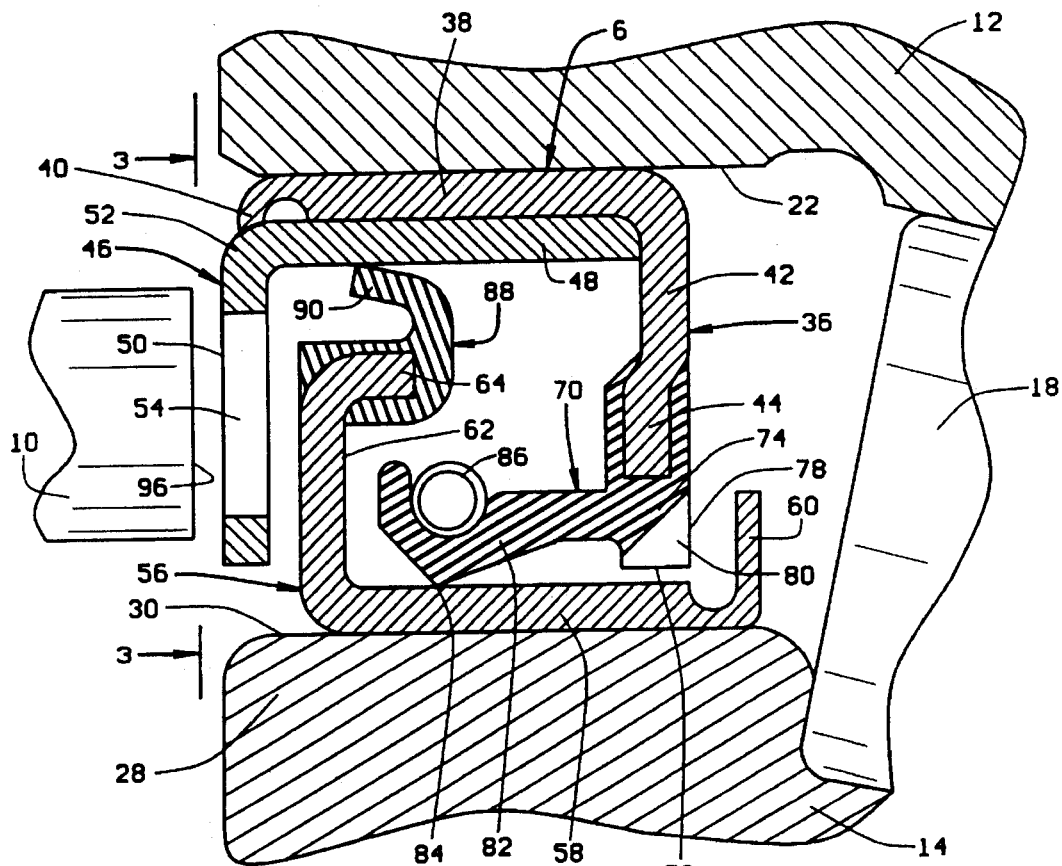
FIG. 2 is an enlarged sectional view of the seal fitted to the bearing assembly.

The inboard seal 6 includes (FIG. 2) an outer seal case 36 which is formed from steel as a stamping and as such is quite rigid. It has an extended axial wall 38 which fits into the end bore 22 at the inboard end of the cup 2, there being an interference fit between the wall 38 and the cylindrical surface of the bore 22, so that the surface provides a mounting for the outer case 36. The axial wall 38 at one end of the bore 22 merges into a short retaining lip 40 which turns radially inwardly, yet does not project beyond the end of the cup 12. At its opposite end the axial wall 38 merges into a radial wall 42 which extends radially inwardly toward the thrust rib 28 of the inboard cone 14, terminating at a slight axial offset 44 that encircles, yet lies outwardly from, the cylindrical surface 30 on the rib 28. The radial wall 44 and its offset 44 lie immediately beyond the large ends of the rollers 18.

Figure 3:
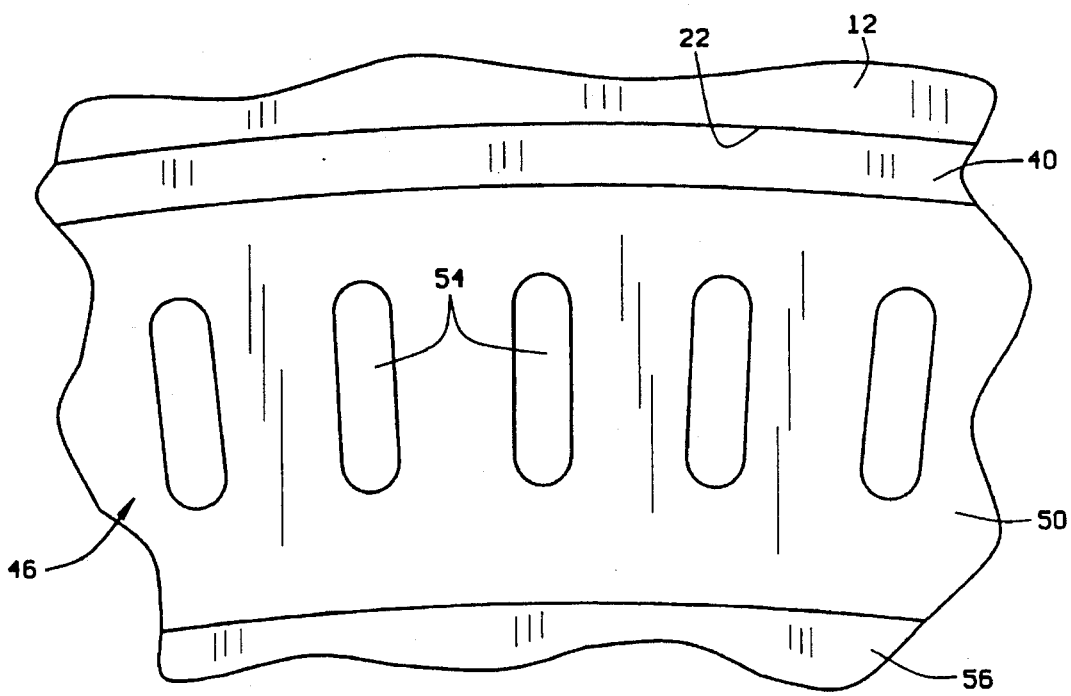
FIG. 3 is a fragmentary end view of the seal assembly taken along line 3—3 of FIG. 2.

The outer seal case 36 carries an encoder ring 46 which is likewise formed as a steel stamping and is thus quite rigid. It includes an axial wall 48 and a radial wall 50, with the two merging at a slight radius or corner 52. The axial wall 48 of the ring 46 fits snugly into axial wall 38 of the outer case—indeed, such that an interference fit exists between the two. The free end of the axial wall 48 bears against the radial wall 42 of the outer case 36 where it is beveled slightly to accommodate the slight inside radius at which the axial and radial walls 38 and 42 of the cases 36 are joined. On the other hand, the corner 52 of the ring 42 lies immediately inwardly from the retaining lip 40 of the outer case 36, and indeed the retaining lip 40 is swaged inwardly so that its end bears against the outside radius of the corner 52 without projecting axially beyond the radial wall 50. This in effect joins the two axial walls 38 and 48 such that the encoder ring 46 is captured within the outer case 36, and as such, the encoder ring 46 cannot be withdrawn from the case 36. The radial wall 50 of the encoder ring 46 lies essentially flush with the end face of the cup 12 and the back face of the inboard cone 14 and extends radially inwardly past the axial offset on the radial wall 42 of the case 36. Moreover, the radial wall 50 contains elongated apertures 54 (FIG. 3) arranged circumferentially around the axis X at equal circumferential intervals. The longitudinal axes of the apertures 54 lie along radii that emanate from the axis X.

The inboard seal 6 also has an inner case 56 (FIG. 2) that is quite rigid, in that it too is formed as a steel stamping. It includes an extended axial wall 58 which fits over the cylindrical surface 30 on the thrust rib 28 for the inboard cone 14, and thus lies immediately inwardly from the radial wall 42 of the outer case 36. An interference fit exists between the axial wall 58 and the cylindrical surface 30 of the rib 28, so the cylindrical surface 30 provides a mounting for the inner case 36. At its end closest to inboard row of rollers 18, the wall 58 turns outwardly in the form of a short radial lip 60. At its opposite end the axial wall 58 merges into a radial wall 62 which projects outwardly from the thrust rib 28 into the space between the radial wall 42 of the outer case 36 and the radial wall 50 of the encoder ring 46, it being closer to the latter than the former. But the radial wall 62 terminates short of the axial wall 38 on the outer case 36, and indeed merges into a short return wall 64 which is directed axially toward the radial wall 42 of the outer case 36.

In addition to the two cases 36 and 56, the inboard seal 6 has an inner seal element 70 (FIG. 2) which is formed from an elastomer and thus possesses a measure of flexibility. It is bonded to the offset 44 in the radial wall 42 of the outer case 36. At the inner margin of the radial wall 42 the inner seal element 70 takes the form of a pumping labyrinth 74 having a cylindrical surface 76 which lies around, but is spaced slightly away from the extended axial wall 58 of the inner case 36. The labyrinth 74 also has a front face 78 which is presented toward the lip 60 on the inner case 56. The labyrinth 74 contains pumping cavities 80 which open out of the cylindrical surface 76 and the front face 78, interrupting the edge at which those surfaces intersect. The side surfaces of the cavities 80 lie oblique to the direction of relative movement between the pumping labyrinth 74 and the extended axial wall 58 on the inner case 56 so as to direct any lubricant that enters the cavities 80 back toward the lip 60 and the interior of the bearing A. The seal element 70 also includes a contact lip 82 which projects generally axially away from the labyrinth 74 toward the radial wall 62 of the inner case 56 and has converging surfaces which meet at an edge 84 where the lip 82 contacts the extended axial wall 58 of the inner case 56. Indeed, immediately behind the edge 84, the lip 82 has a groove which contains a garter spring 86 that urges the lip 82 toward the axial wall 58 to ensure that the edge 84 remains in contact with the wall 58. Thus, the pumping labyrinth 74 and contact lip 82 establish fluid barriers along the extended axial wall 58 of the inner case 56.

Another fluid barrier exists between the return wall 64 of the inner case 56 and the axial wall 48 of the encoder ring 46, which is fitted to the outer case 36, that barrier being established by an elastomeric outer seal element 88 (FIG. 2) which is bonded to the axial return wall 64. The seal element 88 includes a lip 90 which projects radially toward the axial wall 48 of the encoder ring 46 and then turns obliquely away from the radial wall 42 of the inner case 36. The obliquely directed portion of the lip 90 contacts the axial wall 48 of the ring 46. Being formed from an elastomer, the lip 90 possesses a measure of flexibility.

The speed sensor 10 is mounted on the suspension system C of the vehicle or at least is in a position that is fixed with respect to the spindle 2. It includes a head 96 that is presented toward, yet spaced only slightly away from, the radial wall 50 of the encoder ring. The position of the sensor 10 is such that the apertures 54 in its radial wall 50 pass by the head 96 of the sensor 10 as the hub 4 rotates on the bearing A about the spindle 2. The sensor 10 also has electrical leads 98 (FIG. 1) extended from it, and they connect the sensor 10 with a processor that monitors the signal produced by it as well as signals from sensors at the other wheels of the vehicle.

The seal 6 is furnished fully assembled, and as such its two cases 36 and 56 cannot be separated. To install the seal 6 in the bearing A one simply aligns the axial wall 38 of the outer case 36 with the end bore 22 at the outboard end of the cup 12 and concurrently aligns the extended axial wall 58 of the inner case 56 with the cylindrical surface 30 on the thrust rib 28 of the inboard cone 14. Thereupon, axially directed forces are applied to both the outer and inner cases 36 and 56, with sufficient magnitude to drive the axial wall 38 of the outer case 36 along the cylindrical surface of the end bore 22 and the extended axial wall 58 of the inner case 56 over the cylindrical surface 30 of the thrust rib 28. The axial force on the outer case 36 continues until the exposed face of the radial wall 50 on the encoder ring 46 lies generally flush with the end face of the cup 12. The axial force on the inner case 56 continues until the radial wall 62 of that case lies approximately midway between the radial wall 50 of the encoder ring 46 and the end of the contact lip 82 for the seal element 70 on the outer case 36, although the axial position of the inner case 56 need not be established with much precision, since the seal elements 70 and 88 are effective anywhere along the axial walls 58 and 38.

The outboard seal 8 fits into the outboard end bore 22 of the cup 12 and around the thrust rib 28 of the outboard cone. Preferably it takes the form of the inboard seal 6, absent the encoder ring—although seals of other configurations are acceptable as well. It is installed in a like manner.

Being secured in the end bores 22 of the unitary or double cup 12, the seals 6 and 8 prevent the cones 14 and 16 from being withdrawn from the cup 12. The seals 6 and 8 thus serve to unitize the bearing A, enabling the bearing A to be furnished as a unitary package.

In operation, the sensor 10 produces a magnetic field, the flux of which passes through the nearby radial wall 50 of the encoder ring 46. Being formed from a ferrous substance, the radial wall 50 actually forms a path or circuit for the flux. But the wall 50 is nonuniform, owing to the presence of the apertures 54 in it, and as a consequence it disrupts or imparts variations to the magnetic field as the wall 50 revolves in front of the sensor 10. That, of course, occurs when the wheel B and hub 2 rotate on the bearing A about the spindle 2. The variations in the flux are cyclic, with their frequency being proportional to the the angular velocity of the ring 46. The sensor 10 detects those variations and through its leads 98 delivers a pulsating signal, the frequency of which reflects the angular velocity.

Figure 4:
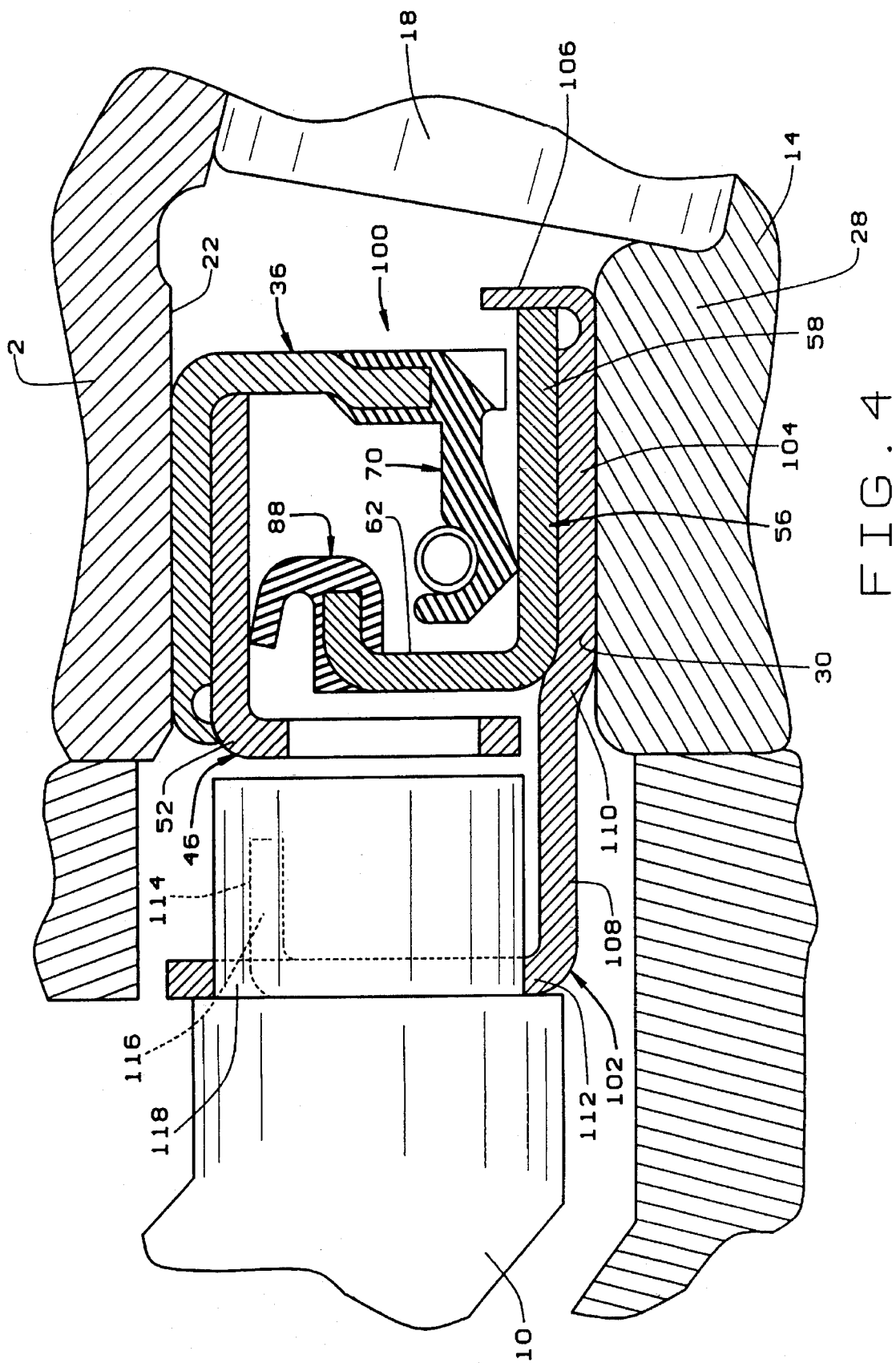
FIG. 4 is a sectional view in elevation of a bearing assembly fitted with a modified seal.

A modified seal 100 (FIG. 4) is very similar to the seal 6—indeed, to the extent it embodies the seal 6 virtually in its entirety—but in addition serves as a mount for the sensor 10. To this end, the modified seal 100 further includes an annular carrier 102 which fits over the thrust rib 30 of the bearing A and projects out of the annular space formed by the inboard end bore 22, that is to say beyond the end of the cup 12 and the backface of the inboard cone 14. In this region the carrier 102 supports the sensor 10.

The carrier 102 includes an axial wall 104 which fits over the thrust rib 28 of the inboard cone 14, there being an interference fit between the cylindrical surface 30 of the rib 28 and the wall 104. The length of the axial wall 104 is about the same as the length of the extended axial wall 58 of the inner seal case 56, and indeed the wall 58 fits around the wall 104, there likewise being an interference fit between them. Nevertheless, the inner case 56 is mechanically captured on the carrier 100 so that it cannot shift axially. To this end, the axial wall 104 at its one end is provided with a lip 106 which turns radially outwardly opposite the large end faces of the tapered rollers 18. At its opposite end the axial wall 104 merges into another axial wall 108 at an offset 110 which renders the wall 108 slightly larger in diameter than the wall 104. The extended axial wall 58 of the inner case 56 lies captured between the offset 108 and the lip 106 of the carrier 100. The axial wall 58 of the inner case 56 does not have a lip 60.

Figure 5:
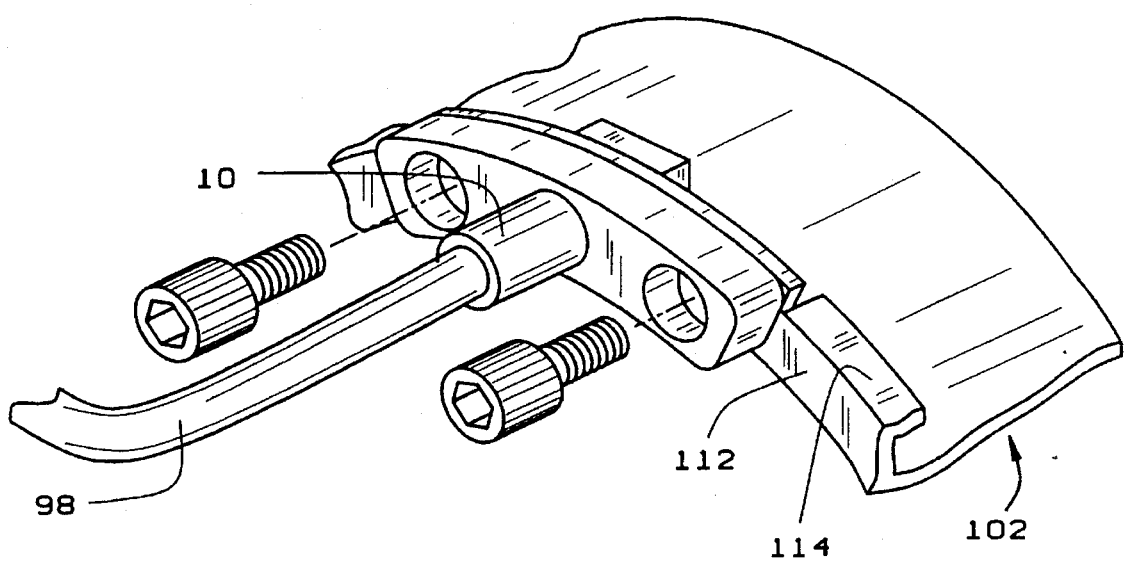
FIG. 5 is a fragmentary sectional view showing the sensor attached to the carrier of the modified seal.

The larger axial wall 108 projects axially through the radial wall 50 on the encoder ring 46 and outside of the cup 12 merges into a radial wall 112 which lies parallel to the radial wall 50 of the encoder ring 46. The radial wall 112 in turn merges into short return wall 114 which projects axially toward the encoder ring 46 and imparts rigidity to the radial wall 112. To this end, the return wall 114 extends substantially the entire circumference of the carrier 102, except for a notch 116 (FIG. 5). Here the radial wall 112 projects beyond the return wall 114 and is provided with an aperture 118 which receives the sensor 10, presenting its head 96 toward the circular row of apertures 54 of the encoder ring 46. In this regard, the sensor 10 has a flange through which machine bolts 122 pass, threading into the extended portion of the wall 112 to thereby secure the sensor 10 to the carrier 100.

Either of the seals 6 or 100 may be manufactured with the axial wall 38 of its outer case 36 and the axial wall 48 of its encoder ring reversed. In that case, the axial wall 38 of the case 36 would fit snugly into the axial wall 48 of the ring 46, and a friction fit would exist between the axial wall 48 of the ring 46 and the cylindrical surface of the end bore 22. Moreover the axial wall 48 of the encoder ring 46 would have the retaining lip 40 to capture the outer case 36 in the encoder ring 46.

Figure 6:
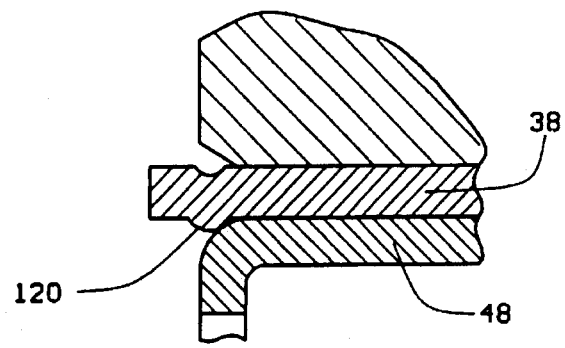
FIG. 6 is a fragmentary sectional view showing the outer seal case and encoder ring joined by staking.

Irrespective of which wall 38 or 48 is located outermost, the two walls may be joined together by means other than the lip 40. For example, they may be joined by staking, welding or adhesive bonding, and in any of those the lip 40 may be eliminated. When staked (FIG. 6) the axial wall 38, assuming it is outermost, projects slightly beyond the corner 52 on the inner wall 48 and has dimples 120 which are driven down against the outside surface of the corner 52.

This invention is intended to cover all changes and modifications of the example of the invention herein chosen for purposes of the disclosure which do not constitute departures from the spirit and scope of the invention.

What is claimed is:

1. In combination with a bearing that comprises an outer race which rotates about an axis and has a raceway that is presented inwardly toward the axis and a bore that leads away from the raceway and opens out of the end of the race, an inner race located within the outer race and having a raceway that is presented outwardly toward the raceway of the outer race and a mounting surface located beyond the raceway and extending into the bore of the outer race, whereby an annular space exists between the two races beyond their respective raceways, and rolling elements located between the two races and contacting the raceways to enable the outer race to rotate around the inner race and about the axis with little friction; an improved seal for closing the annular space between the races, said seal being located within the bore of the outer race and comprising: an outer case fitted securely to the outer race within the bore thereof and having an axial wall located within the bore; an inner case fitted securely to the inner race and having an axial wall located around the mounting surface; a flexible seal element on at least one of the cases and effecting a fluid barrier with a surface carried by the other case, and a ferrous encoder ring attached to the outer case and having an axial wall located along the axial wall of the outer case and a radial wall which is directed inwardly from the axial wall of the ring and is exposed at the end of the bore generally in front of the two seal cases and the flexible seal element, the radial wall of the encoder ring being formed integral with the axial wall of the encoder ring and having a diameter generally no greater than that of the bore, the radial wall having disruptions therein of a character which will alter a magnetic field when the ring rotates about the axis, so that the encoder ring will excite a sensor and enable the sensor to deliver a signal that reflects angular velocity.

2. The combination according to claim 1 wherein the axial wall of the outer case and the axial wall of the encoder ring are fitted snugly together, with one inside the other, the outer of the axial walls being fitted snugly to the outer race along the surface that defines the bore on that race.

3. The combination according to claim 2 wherein the outer case has a radial wall which is connected to and projects inwardly from the axial wall of the outer case toward the axis and is spaced axially from the radial wall of the encoder ring; wherein the outer case and encoder ring are connected firmly together so that the spacing between the radial walls of the outer case and encoder ring is fixed; and wherein the inner case has a radial wall which is connected to and projects outwardly from the axial wall of the inner case away from the axis and lies between the radial wall of the outer case and the radial wall of the encoder ring, yet is spaced from both of those radial walls.

4. The combination according to claim 3 wherein one of the flexible seal elements is attached to the radial wall of the outer case and bears against the axial wall of the inner case.

5. The combination according to claim 4 wherein another flexible seal element is carried by the radial wall of the inner case and projects outwardly toward the axial walls of the outer case and encoder ring, and establishes a fluid barrier along the inner of those axial walls.

6. The combination according to claim 3 and further comprising a carrier which fits around the mounting surface of the inner race and extends along the axial wall of the inner case, the carrier extending axially through and beyond the radial wall of the encoder ring; and a sensor mounted on the carrier and being presented toward the radial wall of the encoder ring such that the disruptions in the encoder ring pass by the sensor as the outer race revolves about the axis of rotation.

7. The combination according to claim 1 and further comprising a carrier mounted on the inner race, and a sensor mounted on the carrier and presented toward the radial wall of the encoder ring such that the disruptions move past the sensor as the outer race revolves about the axis.

8. The combination according to claim 7 wherein the carrier fits around the mounting surface on the inner race.

9. A seal for establishing an annular fluid barrier around an axis of rotation, said seal comprising: an outer case having an axial wall and a radial wall extended inwardly from the axial wall toward the axis; a ferrous encoder ring having an axial wall located along and against the axial wall of the outer case, so that one of the axial walls overlies the other axial wall, and a radial wall connected to and extended inwardly from the axial wall toward the axis, the radial wall and axial wall of the encoder ring being formed integral with the greatest diameter of the radial wall being where it is connected to the axial wall, the radial wall of the encoder ring having disruptions arranged in a circular row around the axis of rotation, the radial wall of the ring being spaced axially from the radial wall of the outer case; a rigid inner case having an axial wall and a radial wall extending outwardly from the axial wall into the space between the radial walls of the outer case and encoder ring; a flexible seal element attached to the radial wall of the outer case and establishing a live fluid barrier along the axial wall of the inner case; and another flexible seal element carried by the radial wall of the inner case and establishing a live fluid barrier along the inner of the two overlying axial walls of the outer case and encoder ring.

10. A seal according to claim 9 wherein seal elements contact the axial walls along which they establish fluid barriers.

11. A seal according to claim 9 wherein the disruptions in the radial wall of the encoder ring are apertures.

12. A seal according to claim 9 wherein the axial wall of the encoder ring lies inside the axial wall of the outer case and is captured in the outer case so that it cannot be displaced axially.

13. A seal according to claim 9 and further comprising a carrier projecting axially from the inner case and through the radial wall of the encoder ring for supporting a sensor and presenting it opposite the disruptions on the radial wall of the encoder ring, 14. A seal according to claim 13 wherein the carrier has an axial wall, and the axial wall of the inner case fits snugly around the axial wall of the carrier.

15. A seal according to claim 14 wherein the carrier further includes a radial wall which projects outwardly from the radial wall of the carrier and is presented opposite the radial wall of the encoder ring such that the radial wall of the encoder ring lies between the radial wall of the carrier and the radial wall of the inner case.

16. The combination according to claim 1 wherein the outer case, the inner case, the encoder ring, and the seal element are all located substantially entirely within the bore of the outer race.

* * * * *